United States Patent [19]

Watanabe

[11] Patent Number: 5,471,054
[45] Date of Patent: Nov. 28, 1995

[54] ENCODER FOR PROVIDING CALIBRATED MEASUREMENT CAPABILITY OF ROTATION OR LINEAR MOVEMENT OF AN OBJECT, LABEL MEDIUM AND AN OPTICAL IDENTIFICATION SYSTEM

[75] Inventor: Asao Watanabe, Kawasaki, Japan

[73] Assignee: NF. T&M. Systems, Inc., Kawasaki, Japan

[21] Appl. No.: 951,221

[22] Filed: Sep. 25, 1992

[30] Foreign Application Priority Data

Sep. 30, 1991 [JP] Japan ................................ 3-276329
Oct. 9, 1991 [JP] Japan ................................ 3-290855

[51] Int. Cl.[6] .................................................. G01D 5/34
[52] U.S. Cl. ........................... 250/231.13; 250/237 G; 356/373; 359/530; 341/31
[58] Field of Search .................... 250/231.13, 231.18, 250/237 G, 231.14; 341/13, 31; 356/373, 374; 359/529, 530; 235/454

[56] References Cited

U.S. PATENT DOCUMENTS

| | | | |
|---|---|---|---|
| 3,627,069 | 12/1971 | Ray et al. | 250/231.18 |
| 4,011,435 | 3/1977 | Phelps et al. | 235/454 |
| 4,201,911 | 5/1980 | Dering | 250/231.17 |
| 4,593,193 | 6/1986 | Michaelis | 250/231.14 |
| 4,634,861 | 1/1987 | Ching et al. | 250/231.18 |
| 4,707,683 | 11/1987 | Yao | 250/231.13 |
| 4,733,071 | 3/1988 | Tokunaga | 250/237 G |
| 4,751,383 | 6/1988 | Ueyama | 250/237 G |
| 4,810,892 | 3/1989 | Hermann | 250/231.13 |
| 4,820,918 | 4/1989 | Igaki et al. | 250/237 G |
| 4,987,299 | 1/1991 | Kobayashi et al. | 250/231.18 |
| 5,021,735 | 6/1991 | Maass et al. | 250/231.18 |
| 5,076,696 | 12/1991 | de Yos et al. | 235/467 |
| 5,091,636 | 2/1992 | Takada et al. | 235/454 |
| 5,138,564 | 8/1992 | de Jong et al. | 250/231.14 |
| 5,198,738 | 3/1993 | Blaser et al. | 250/231.18 |
| 5,233,407 | 8/1993 | Ogata | 250/237 G |

Primary Examiner—Stephone B. Allen
Attorney, Agent, or Firm—Dellett and Walters

[57] ABSTRACT

A scale comprising a regular arrangement of optically or magnetically different response characteristics such as light reflection and light diffusion portions or light reflection and absorption portions is attached to a moving object either directly or by way of an intermediate member. The scale can be attached to a motor or the like even after assembling with associated mechanical components, thereby enabling easy measurement of the mode of operation of the motor or similar movable objects. The light beam from the light emitting device is directed to the label media and the reflected light beam is received by a light receiving device to identify the individual object or product based on the label.

15 Claims, 15 Drawing Sheets

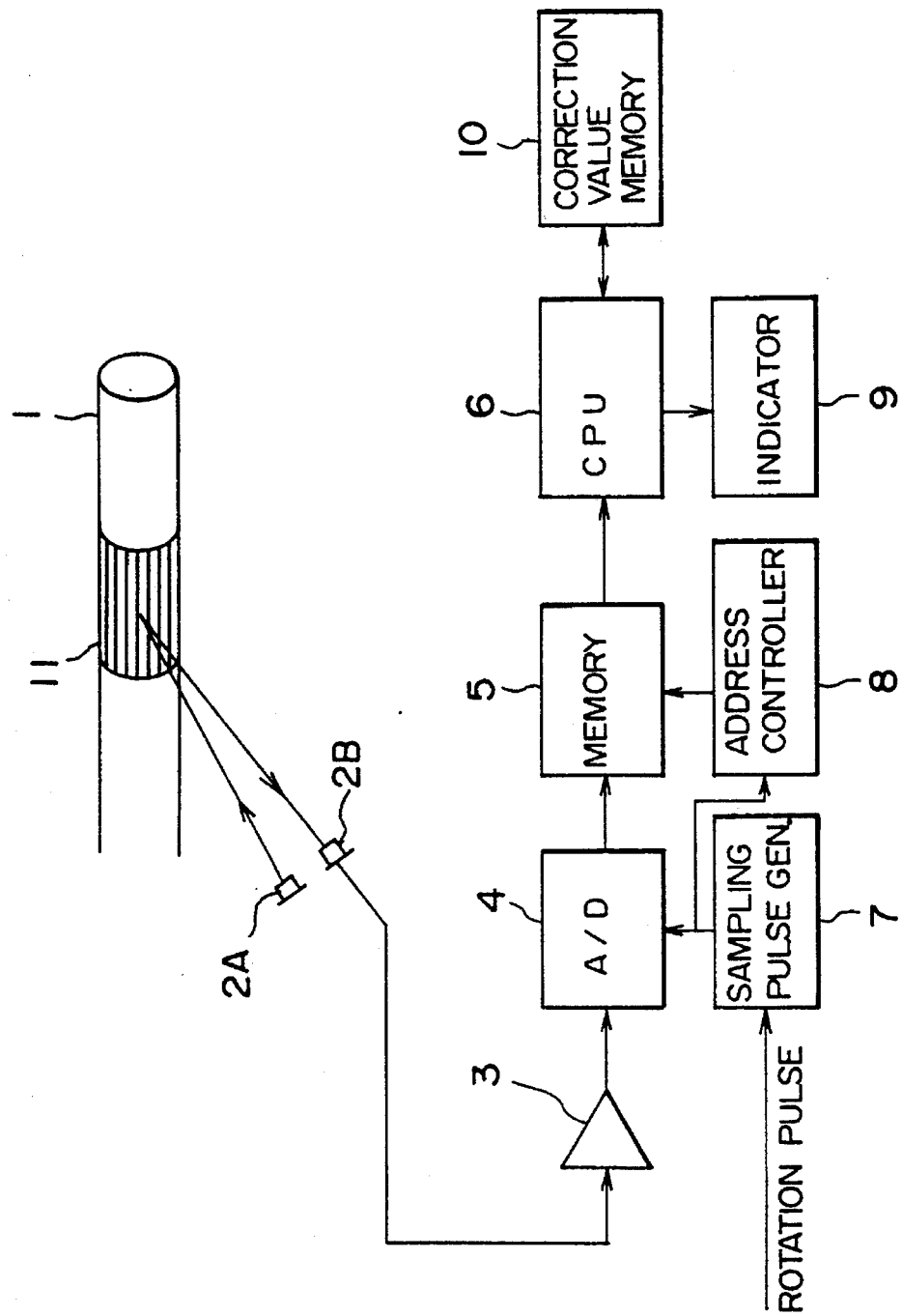

ENCODER FOR PROVIDING CALIBRATED MEASUREMENT CAPABILITY OF ROTATION OR LINEAR MOVEMENT OF AN OBJECT, LABEL MEDIUM AND AN OPTICAL IDENTIFICATION SYSTEM

BACKGROUND OF THE INVENTION

The present invention relates to an encoder and an optical identification system, and more specifically to an encoder to be mounted on a movable object to be measured without disassembling for measuring the mode of movement and an optical identification system suited for identifying the information carried on label media.

Various techniques have been proposed as an encoder to measure the movement mode of shaft rotation for, for example, a stepping motor and the like. A measurement of the rotation mode of the motor shaft can be made by directly coupling the encoder to the motor shaft. However, it is not easy to measure the rotation mode after assembling the motor to associated mechanical parts.

Examples of measuring the rotation mode of an assembled motor shaft are Illustrated in FIGS. 23 and 24. In FIG. 23, an encoder 104 is mounted onto a shaft 103 directly coupled to a rotary portion of a mechanical part 100 coupled to a shaft of a motor 102. In FIG. 24, the encoder 104 is coupled to a separate shaft 103A at the side of the motor 102 opposite to the mechanical part 100.

Illustrated in FIG. 25 is a typical construction of the encoder. In FIG. 25, a large number of apertures A are formed radially along the periphery of a rotary disc 110 directly coupled to the shaft 100. A light emitting diode 111 and a light receiving device 112 are disposed at both sides of the apertures A. The light beam from the light emitting diode 111 is received by the light receiving diode 112 through the apertures A of the rotary disc 110 and converted into an electrical signal to be applied to one input of a voltage comparator 113. The voltage comparator 113 compares the input signal with a threshold level supplied to the other input (not shown) to obtain a pulse signal. The pulse signal thus obtained is used to measure the rotation mode such as rotary angle, rotary direction, rotary speed. Illustrated in FIG. 26 are A phase, B phase and Z phase output pulses From the voltage comparator 113 in FIG. 25, where the A phase and B phase output pulses are derived from apertures slightly shifted in the rotary direction. The Z phase output pulse is derived from a reference aperture (not shown) at one location in the periphery. The phase relationship and period T of these pulses are used to obtain the rotary direction and rotary speed. In the drawing, CW means clockwise while CCW means counterclockwise.

In such conventional encoder, it is required to couple the encoder 104 to the shaft 103 of the mechanical part 100 to be measured as shown in FIG. 23. Such coupling requires a specially designed construction intended to couple the encoder, thereby resulting in increased cost. Accordingly, in a compact construction typical in OA equipments and the like, it is required to couple the encoder for the purpose of performance inspection and the like. In the construction as illustrated in FIG. 24, it is required to provide the special shaft 103 for coupling the encoder to the motor, thereby increasing cost.

In other words, it was very difficult to mount an encoder to mechanical parts that are not intended to mount the encoder. This is a large obstacle in performing various tests of quantity production apparatus.

On the other hand, a bar code or label media comprising alternating patterns of regular block and white stripes on a tape-shaped sheet has been used very extensively. Such bar code label media is advantageous in that the label media can be made by simple printing technology and that a large number of code information can be indicated by choosing the number and the arrangement of the black and white patterns. Also widely used is an optical identification system to identify the bar code information by directing and scanning a light (laser beam) onto the bar code label placed on various goods and by detecting the reflected light from the surface of the bar code label with an optical detector. The reflected light is modulated responsive to the bar code.

The conventional bar code mostly comprises alternating black and white stripes over a certain length. However, such conventional bar code label media has the following shortcomings.

For effective reception of the reflected light from the label, the laser beam must be directed normal to the label media to be detected by an optical detector positioned also in the normal line. However, it is usually very difficult to direct the laser beam normal to the label media placed on goods which are held by an operator. Accordingly, the angle of the incident laser beam onto the bar code surface is not normally at a right angle to the surface and may vary over a wide range. As a result, the reflected laser beam tends to vary over a wide angle, thereby requiring the design of the optical detector to have a large light receiving area so as to respond to such reflected light. This results in complexity in optical detection and increased size and cost of the optical identification system.

It may be possible to locate the light source (light emitting diode) and the optical detector (light receiving diode) in a symmetrical angle with respect to the normal line to the object so that the reflected laser beam from the incident surface is collected at a relatively narrow area where the light receiving surface of the optical detector is placed. However, even in this case, the light receiving surface must be relatively large because of the same reason as the above. In addition, positioning the light emitting (or laser) diode and the optical detector with a predetermined distance therebetween is difficult to achieve in compact system designs and costly. These problems are common to optical identification systems for identifying bar codes on label media.

SUMMARY OF THE INVENTION

It is therefore an object of the present invention to provide an encoder capable of mounting on a desired portion of an object under test.

It is another object of the present invention to provide an encoder easy to install and improved in measurement accuracy.

It is still another object of the present invention to provide an encoder simple in installation while maintaining the above advantages.

It is an additional object of the present invention to provide a label medium and an optical identification system wherein both light emitting and receiving devices can be located substantially in a line for miniaturization and cost reduction.

In accordance with the present invention, an encoder detects the operation mode of a motor shaft or the like. A scale comprising a regular arrangement of optically or magnetically different response characteristics such as light reflection and light diffusion portions or light reflection and absorption portions is attached to such moving object either directly or by way of an intermediate member. Optical or magnetic means is used to detect the difference in such response characteristics of the scale. The scale can be attached to a motor or the like even after having been assembled with associated mechanical components, thereby enabling easy measurement of the operation mode of the motor and similar movable objects.

On the other hand, a label medium is employed for an optical identification system. The label medium comprises a particular combination of, for example, light absorbing and reflecting portions depending on the object or product (goods). The light reflecting portion comprises a recess of two slanted surfaces crossing at a right angle to each other so that the incident or incoming light beam is parallel to the reflection or outgoing light beam. The light absorbing or diffusing portion has a different optical response characteristic from that of the light reflected portion. Light emitting and receiving devices are disposed at close proximity to each other. The light beam from the light emitting device is directed to the label medium and the reflected light beam is received by the light receiving device to identify the individual object or product based on the label.

BRIEF DESCRIPTION OF DRAWINGS

FIG. 1 illustrates the construction partly in block diagram of one embodiment of the encoder according to the present invention.

DESCRIPTION OF PREFERRED EMBODIMENTS

Figure 2A:
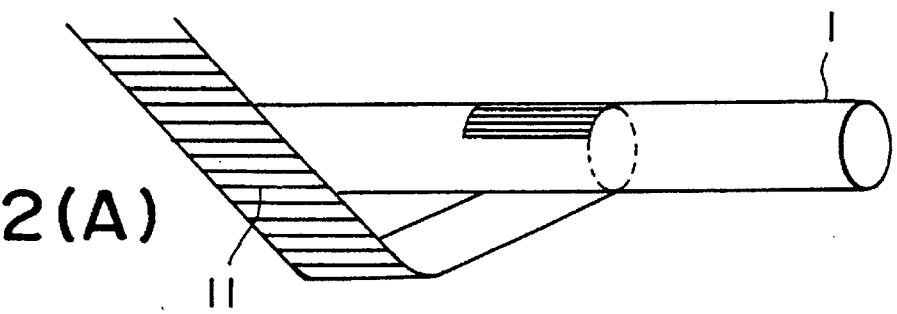
FIG. 2(A) is a perspective view of a mounting mechanism of an assembling type encoder onto a shaft.

Now, the present invention will be described by way of preferred embodiments with reference to the accompanying drawings.

Illustrated in FIG. 1 is a construction of one embodiment of the encoder according to the present invention.

In this embodiment, an assembly type encoder 11 is mounted on a shaft 1 to be measured or a device under test. The encoder 11 is, for example, a tape-like encoder having reflection and diffusion (absorption) sections alternately disposed on the surface at a constant pitch. The encoder 11 is preferably adhered on the outer circumference of the shaft 1 using appropriate adhesive material or the like. The use of such encoder is advantageous in that the encoder can be easily attached to any device to be measured which is designed without any consideration for mounting a special encoder. A laser beam from a laser diode 2A mounted on a stationary portion independent from the rotary portion is directed onto the surface of the tape-like encoder 11 on the shaft 1. The light reflected from the surface is received by a photo transistor 2B and transmitted to an amplifier 3 after being converted into an electrical signal. The reflected light is repeatedly intensified or weakened depending on the reflection property on the surface of the encoder 11. Any device having alternate portions of different response property such as pairs of reflection and diffusion sections is referred to as a "scale" herein. The amplifier 3 is designed to amplify the electrical signal from the photo transistor 2B. An analog-to-digital (A/D) converter 4 samples and digitizes the output signal of the rotary object using a sampling pulse of a sampling signal provided by sampling pulse generator 7, wherein the sampling signal has a frequency equal to a multiple of the frequency of the output signal of the output pulses as obtained from measurement of the rotary object. The digital signal from the A/D converter 4 is stored in a memory 5 in accordance with an address signal to be generated by an address controller 8 responsive to the sampling pulse from the sampling pulse generator 7.

It is to be appreciated here that the mounting accuracy of the above encoder has a certain limit. In order to overcome the accuracy problem, the encoder in this embodiment measures the mounting condition after mounting or attaching the encoder to the shaft and the measurement result is stored. In actual measurement, correction is made by reference to the stored measurement result for obtaining the actual positional information of the object to be measured. The correction procedure is as follows:

Firstly, the condition of attachment or mounting of the encoder is measured. For example, in case of using a stepping motor as a driving motor, it is driven in a known fine step driving mode at a slower rate. Measurements for correction are performed after allowing sufficient time for stabilization to eliminate backlash and the like of the rotary portion. A CPU 6 performs arithmetic operation of the reflected light intensity stored in the memory 5 as a function of time. The locations of the scale in the encoder 11 when the object to be measured rotates at a constant rate are stored in a correction value memory 10 as the correction value.

When the object to be measured rotates in an actual condition, the rotary angle per pulse of the driving stepping motor is generally large and it rotates at a faster rate. Accordingly, because it is difficult to rotate the object to be measured accurately in time, as in the case of the above correction procedure, rotation errors result. The rotation error is generally much larger than the angular error of the motor used for driving. In this particular embodiment, however, the correction is made in the above manner for more accurate measurement of the rotary mode under practical conditions.

During measurement, the motor, driving the object to be measured rotates at a desired rate and timing. However, the shaft of the object to be measured does not necessarily rotate at a desired rotary angle due to electrical/mechanical inertia. But, by using the encoder according to the present invention, the electrical/mechanical inertia problems are overcome for enabling accurate positional measurements of the object.

Processing during actual measurements is substantially the same as the above mentioned measurement for correction. That is, the reflected light information from the encoder 11 is stored in the memory 5 by way of the photo transistor 2B, the amplifier 3 and the A/D converter 4. The measurement result stored in the memory 5 is compared to the correction value stored by the CPU 6 in the correction value memory 10 for correction processing in order to calculate the accurate rotary angle of the object being measured. The measurements thus obtained are displayed on an indicator 9.

Although an optical means is used as means to detect the response characteristic of the scale in the above particular embodiment, it is appreciated that magnetic or other means can be used therefor.

Figure 2B:
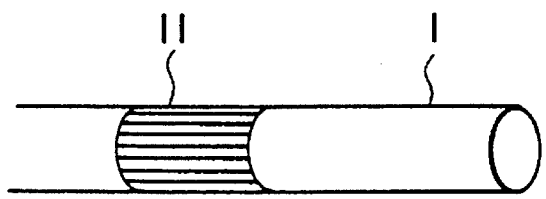
FIG. 2(B) shows the encoder of FIG. 2(A) wound completely around the shaft in a single turn.

Illustrated in FIG. 2(A) is a perspective view of the mounting construction of the encoder 11 on the shaft 1. An appropriate adhesive material is coated on the rear surface of the tape-like encoder 11 having a scale thereon. Such tape-like encoder 11 is wound around the shaft 1 to be measured. Illustrated in FIG. 2(B) is the encoder wound around the shaft with one complete turn.

Figure 3A:
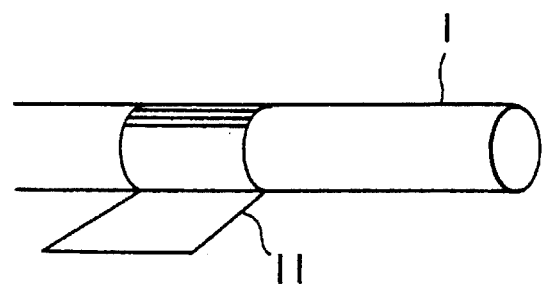
FIG. 3(A) shows the tape-like encoder cut to the length equal to one turn around the shaft.
Figure 3B:
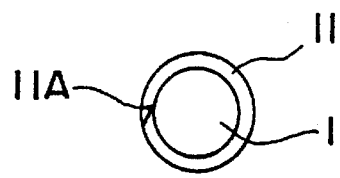
FIG. 3(B) is the tape-like encoder with the ends cut at a slanted angle for case of junction.

The tape-like encoder 11 may be cut in advance to a predetermined length equal to one complete turn around the shaft 1 as shown in FIG. 3(A). The tape-like encoder 11 may be conveniently cut to a predetermined configuration, e.g., at a slanted angle for ease of jointing the ends 11A as shown in FIG. 3(B). Since the shaft to be measured is of a standardized diameter, it is convenient to prepare several different lengths of tape-like encoders in advance.

Figure 4:
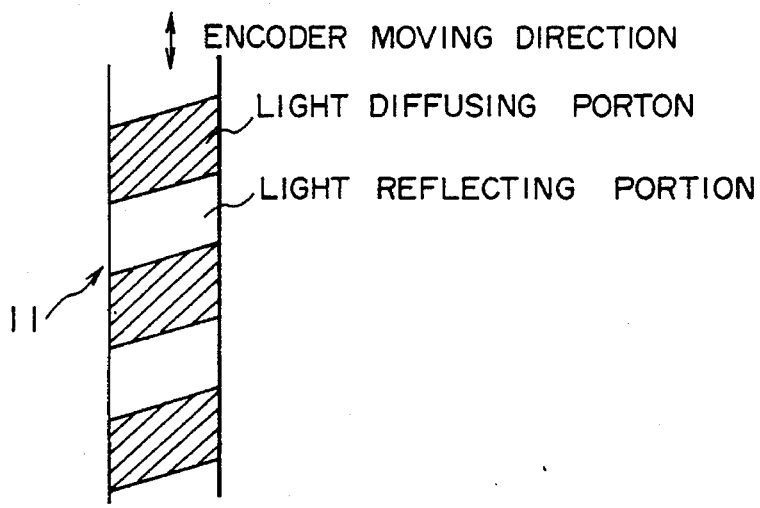
FIG. 4 is an example of the scale mode on the surface of the tape-like encoder.

FIG. 4 shows an example of the scale provided on the surface of the tape-like encoder. In this example, there are formed alternate light diffusing hatched portions and light reflecting white (reflecting) portions of identical sizes both disposed at a constant spacing and slanted with respect to the direction of movement of the encoder 11.

Figure 5:
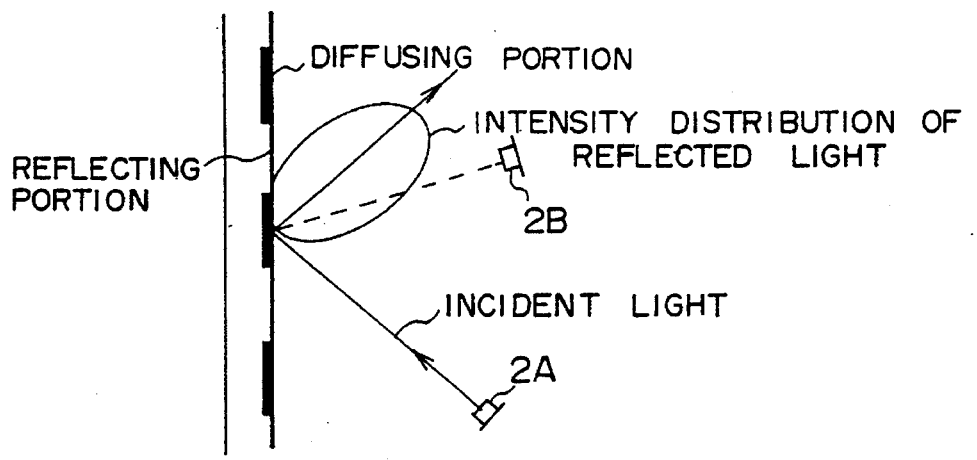
FIG. 5 is an example of a photo diode disposed in such a manner to receive the reflected laser beam from the diffusion portion of the tape-like encoder scale.

Illustrated in FIG. 5 is an example of the photo diode 2B disposed to receive the reflected laser beam from the diffusion portions of the scale of the tape-like encoder 11. The reflected laser beam from the diffusion portion exhibits the intensity distribution with the center thereof normal to the light output surface as defined by the light reflection rule. Accordingly, the diffused light can be received by the photo diode 2B even if it is disposed off the center line of the reflected light.

Figure 6:
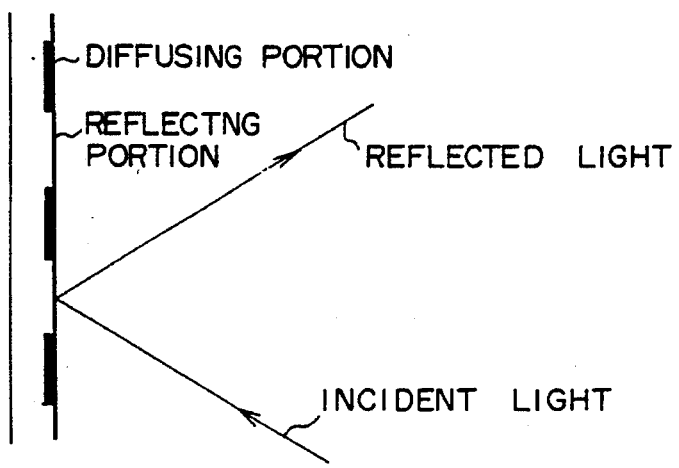
FIG. 6 shows light beam paths for the tape-like encoder.

When the shaft rotates to a position where the incident laser beam is directed onto a reflection portion of the scale of the tape-like encoder 11, the reflected light propagates along a path as shown in FIG. 6 (in the direction of the maximum intensity per the oval in FIG. 5). The photo diode 2B as positioned at the location in FIG. 5 will receive essentially no reflected light, thereby enabling identification of light reflected from the diffusion and reflection portions of the scale. It is of course possible to replace the light diffusion portion with a light absorbing portion.

It is to be understood that the light receiving area of the photo diode is chosen to be large enough to overcome the fluctuation in the light output (reflection) angle of the reflected light due to limited surface stability in the direction of movement of the scale.

Figure 7:
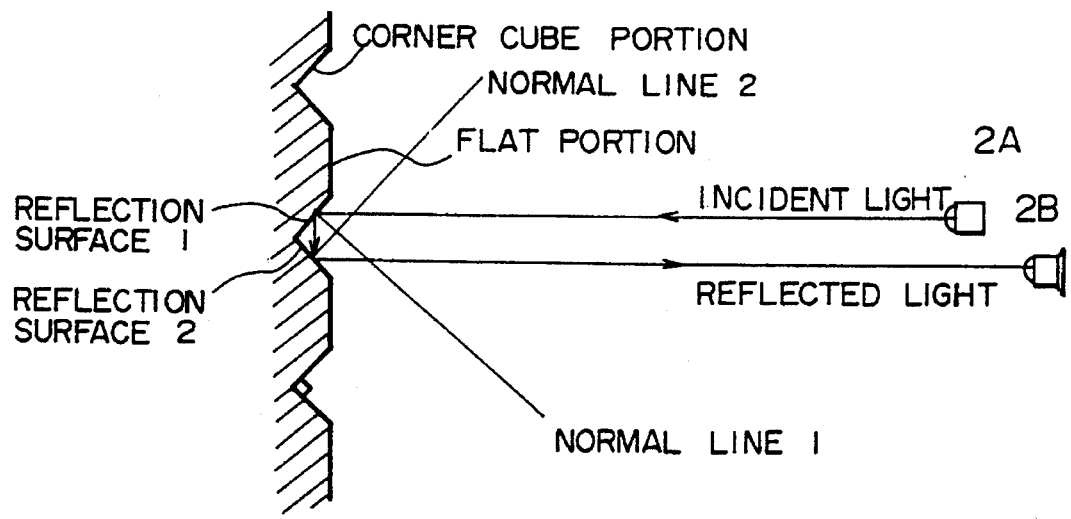
FIG. 7 is a side view of another embodiment of the encoder according to the present invention.
Figure 8:
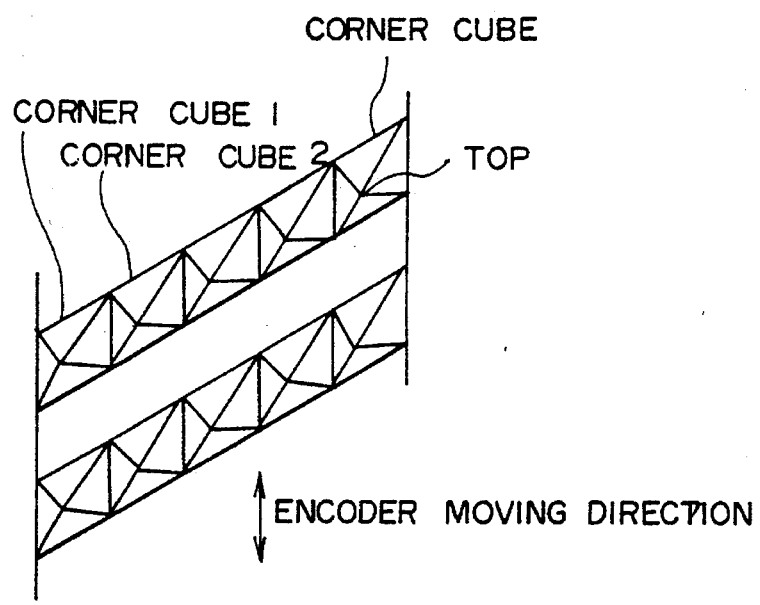
FIG. 8 shows corner cubes disposed in a plurality of rows.

Illustrated in FIG. 7 is a side view of another embodiment of the encoder according to the present invention. This embodiment enables the laser diode 2A and the photo diode 2B to be placed in close proximity to each other, thereby realizing compact construction. A disadvantage of the encoder of the preceding embodiment is the need to dispose the laser diode 2A and the photo diode 2B along different directions. In the embodiment in FIG. 7, however, such disadvantage is overcome by disposing a large number of small corner cubes in a single row as a replacement for the diffusion portions. Each corner cube comprises reflection surfaces R1 and R2 each slanted at 45° with respect to the encoder surface and crossing at right angles to each other so that the incident light is parallel to the reflected output light. This particular construction allows the laser diode 2A as the light source and the photo diode 2B as the light receiver to be disposed along the same direction. This helps to miniaturize the entire apparatus. Additionally, it minimizes the effect of the fluctuation of the encoder surface due to rotation of the object being measured and mounting inaccuracies between the light source/light receiver and the encoder surface. It is understood that the corner cubes may comprise a plurality rows of corner cubes as illustrated in FIG. 8. Alternatively, the corner cubes may be replaced by semispherical micro cells.

Figure 9:
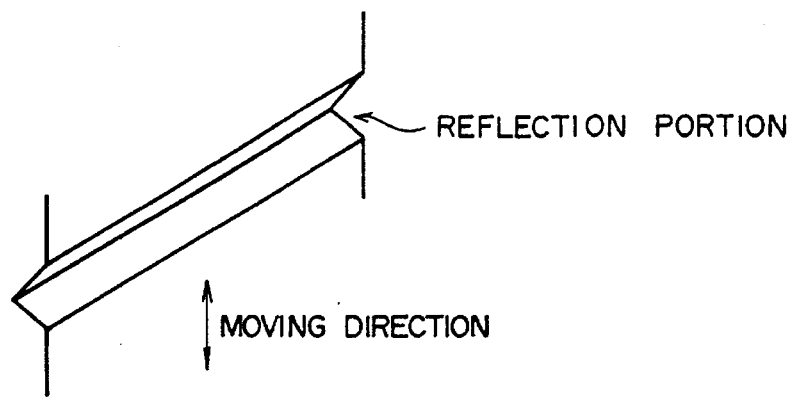
FIG. 9 is an example of the encoder formed with a channel shaped reflection portion.

Illustrated in FIG. 9 is an example of an encoder having a channel-type reflection portion. In this example, the incident light and the reflected light beams are perpendicular to the direction of movement of the encoder and maintain a similar relationship to a normal mirror.

Figure 10:
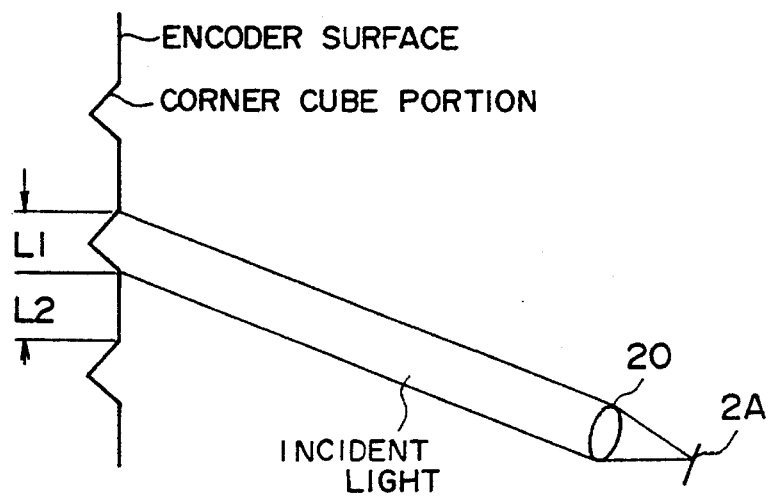
FIG. 10 shows an example to equalize the incident light to the width of the corner cube portion, the diffusion portion and the reflection portion by using a collimator lens.

Illustrated in FIG. 10 is an example of the incoming or incident laser beam from the laser diode 2A to the surface of the encoder. A collimator lens 20 is used to equalize the size of the laser beam with the width of the corner cube portion, the diffusion portion and the reflection portion. This is to maximize the efficiency by choosing the size of the incident light beam equal to the width of the corner cube portion and the like as mentioned above. The reason for this is that diffusion of the reflected (outgoing) light beam, due to interference, is minimized if the size or width of the incident light beam is large, but separation or identification between the diffusion and reflection portions becomes more difficult if the light beam width exceeds the widths L1, L2 of the corner cube and the reflection portions.

Figure 11:
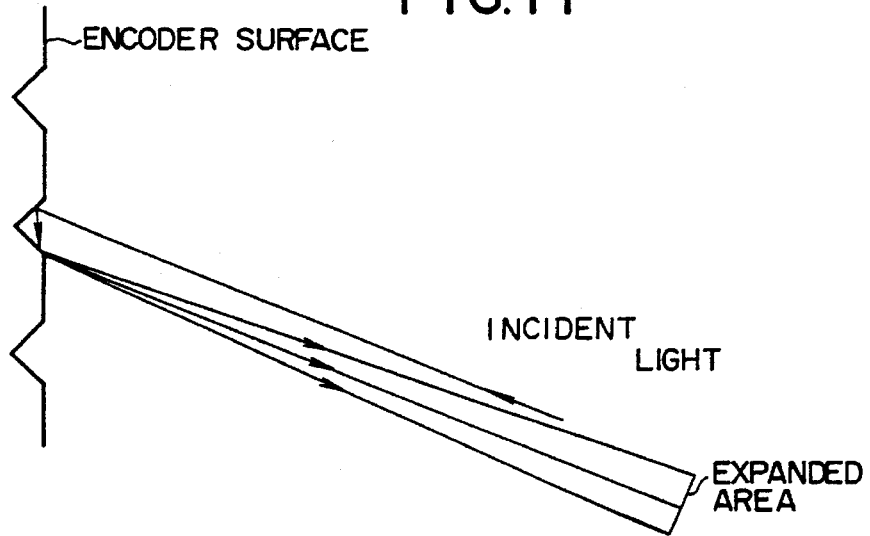
FIG. 11 is an enlarged view of the light receiving face of the photo diode.

If the corner cubes are used on the surface of the encoder, the light source and the light receiving device may be positioned along the same direction. However, limited manufacturing accuracy of the corner cubes and the like and accuracy of mounting the encoder on the object to be measured will cause fluctuation in the reflected light beam. In order to overcome this problem, the light receiving area of the photo diode and the like is expanded in the embodiment as illustrated in FIG. 11.

Figure 12:
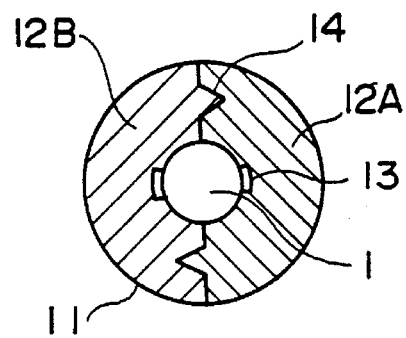
FIG. 12 is a cross section view of another embodiment of the encoder according to the present invention.

Now, another embodiment of an easy-to-mount encoder according to the present invention will be described hereunder by reference to FIG. 12 illustrating such encoder.

Mounted on shaft 1 to be measured are two identical members 12A, 12B which completely cover the outer circumference of the shaft 1. Formed on the outer circumference of the members 12A, 12B is the scale of the above mentioned encoder. The scale may be positioned on the side surface other than the outer circumference. The two members 12A, 12B are coupled by means of a coupler 14. Such coupling may be made using appropriate adhesive material and the like. Notches 13 are formed adjacent the contact surface between the object to be measured and the members 12A. 12B. After measurement, the encoder can be removed from the object to be measured without damaging the same using a nipper or other tool. As apparent from FIG. 12, the diameter of the scale is increased considerably as compared to the tape-like encoder in the above embodiment, thereby improving the measurement accuracy and the way of mounting the scale on the object to be measured.

Figure 13:
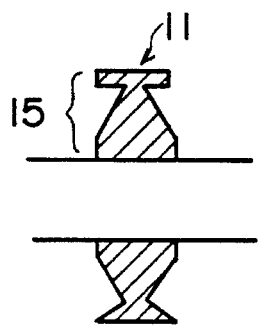
FIG. 13 shows still another embodiment of the present invention.

FIG. 13 shows yet another embodiment of the present invention, wherein a member 15 similar to the members 12A, 12B except the particular cross section is mounted on the shaft to be measured 1. The member 15 is relatively thick to increase the contact area with the shaft to be measured 1 for improved contact and mounting. A scale of the encoder is provided on the outer periphery of the member 15. In this particular embodiment, mass per unit diameter of the member 15 is gradually decreased from the inner portion closer to the shaft 1 to the outer portion except the scale forming portion in order to avoid problems due to increased moment of inertia.

Figure 14:
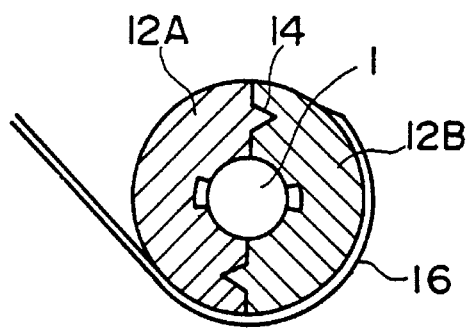
FIG. 14 shows yet another embodiment of the present invention.

The mounting members 12A, 12B, 15 in FIGS. 12 and 13 include the scale provided in advance on the outer circumference or the side surface. However, a tape-like encoder may be attached to the shaft 1 after mounting the mounting member on the shaft 1. Such example is illustrated In FIG. 14. The tape-like encoder 16 is attached on the outer circumference of the members 12A, 12B after being mounted on the shaft 1. According to the embodiment In FIG. 14, the scale has only one junction surface. The scale can be chosen to have any desired pitch.

Figure 15:
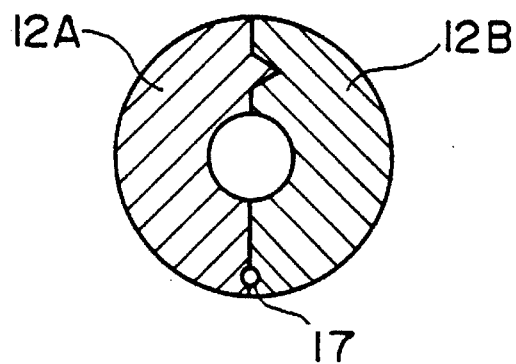
FIG. 15 shows another mounting construction of the mounting member.

Illustrated in FIG. 15 is another construction of the mounting members 12A, 12B. A hinge 17 is used to couple one end of each of the mounting members 12A, 12B, thereby allowing easy installation on the shaft 1.

Figure 16:
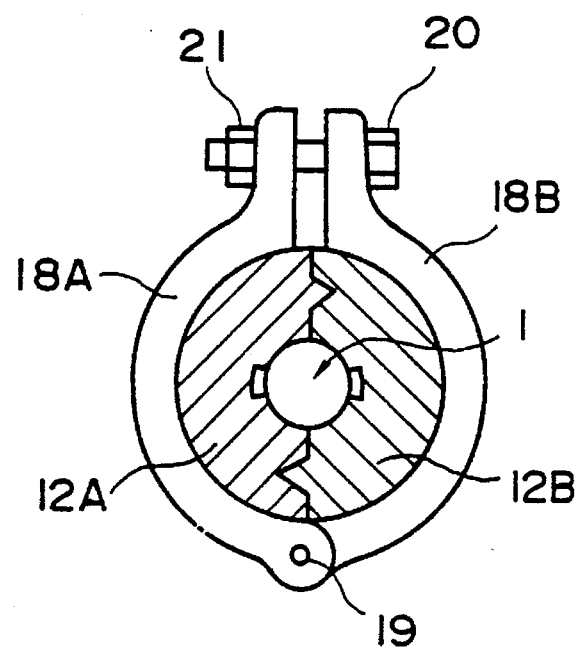
FIG. 16 shows an example of a jig for firmly mounting the members 12A, 12B as illustrated in FIGS. 12 and 13 on the shaft to be measured.

FIG. 16 illustrates a mounting fixture for firmly supporting the members 12A, 12B on the shaft 1 after applying adhesive material on the junction surfaces of the members 12A, 12B when mounting the encoder in FIGS. 12 and 13 on the shaft 1. The shaft 1 is covered with the members 12A, 12B which are then covered with support members 18A, 18B coupled by a hinge 19. A bolt 20 and a nut 21 are used for firmly mounting the members 12A, 12B. The engaging surface of each support member 18, 18b with other elements of the encoder may be made of easily removable material such as fluororesin, etc.

Now, the distortion correction apparatus for the encoder according to the present invention will be described.

Figure 17A:
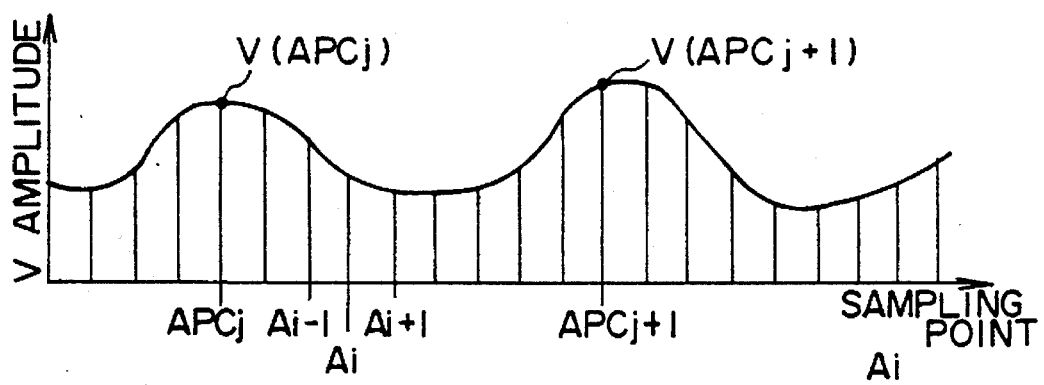
FIG. 17(A) illustrates a way of sampling the received signal of the light receiving device during distortion correction.

FIG. 17(A) illustrates the principle of signal sampling of the signal received from the light receiving device during calibration (correction) in the distortion correction apparatus for the encoder in FIG. 1.

If the object to be measured being rotated by, for example, a stepping motor, it is driven in a known fine pitch mode in the correction procedure for more accurate correction due to the fact that the stepping angle per pulse can be 1/N as compared to that in the normal two-phase driving. Also, by driving the object to be measured at a slower speed, the rate of rotation of the object to be measured can be proportioned more accurately to the rate of the driving pulse as applied to the motor. That is, the encoder according to the present invention which is attachable to the object to be measured can be rotated at a constant speed by applying pulses of a constant rate to the motor. However, it is noted that the object to be measured is allowed to idle until the system is stabilized before carrying out the correction measurements in order to avoid the influence of backlash of the measurement system.

The attachable encoder according to the present invention is basically limited in mounting precision. This results in fluctuation in phase and amplitude of the output signal as received from the light receiving device for detecting the location of the scale as illustrated in FIG. 17(A). In FIG. 17(A), Ai−1, Ai, Ai+1, . . . illustrate sampling points of equal intervals. Apcj, Apcj+1, . . . show the points where the reflected light beam intensity from the scale becomes maximum, and V(Apcj), V(Apcj+1), . . . are the reflected light beam intensity at the above maximum points.

Although each peak position Apcj of the encoder is distorted with respect to the rotary angle of the shaft to be measured, it shows that the peak point exists at the position. In actual measurement, the peak positions are sequentially sought. The position of the shaft to be measured where the sought peak position exists is then determined. Accordingly, the angle of the shaft at that time can be measured, thereby functioning as an encoder.

Figure 18:
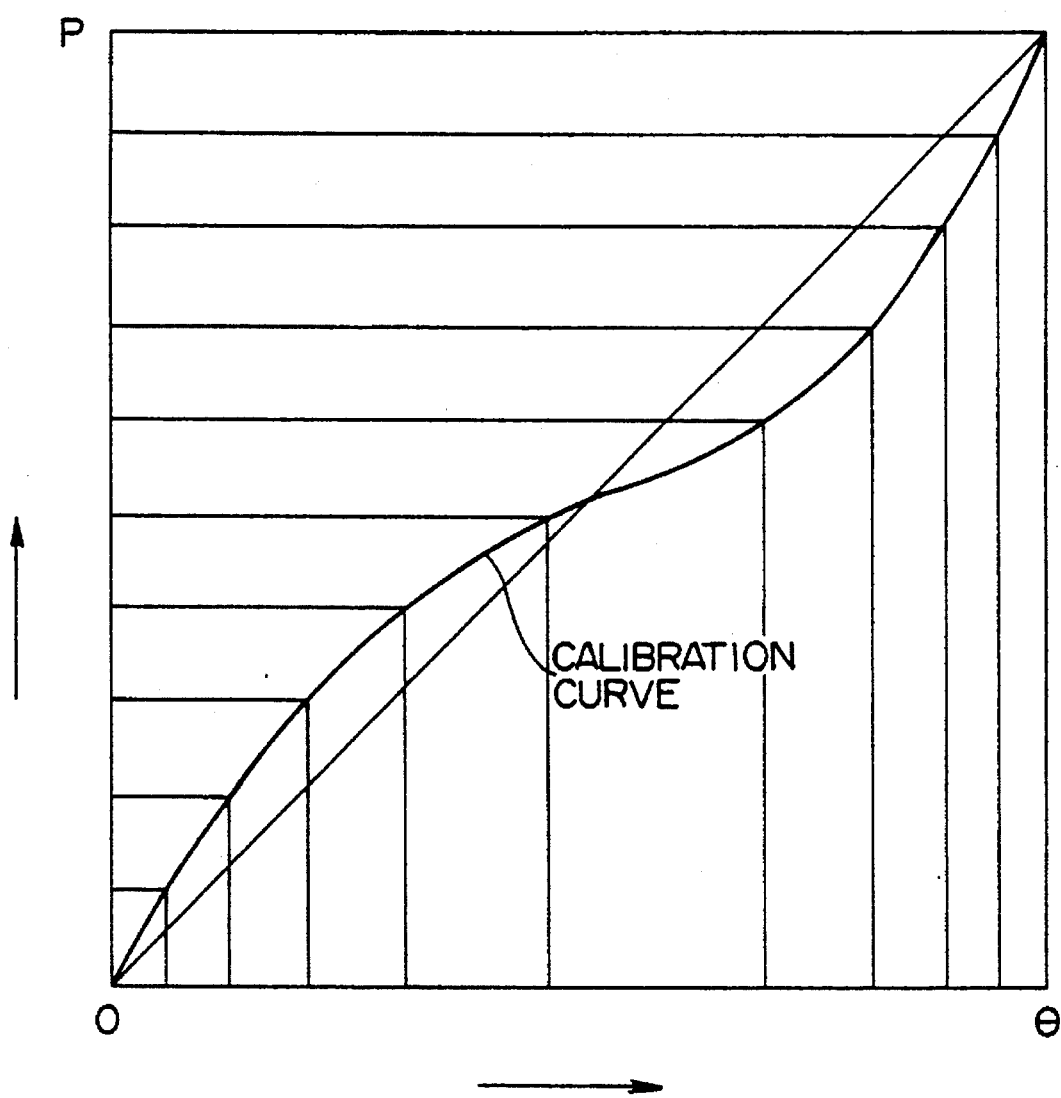
FIG. 18 shows the relationship of the point where the output from the light receiving device becomes the maximum and the real location of the object to be measured in the calibration in FIG. 17(A).

FIG. 18 shows a graph obtained in the correction procedure in FIG. 17(A). The vertical axis (P) is the point Apcj where the output from the above light receiving device reaches peaks, while the horizontal axis (θ) is the actual position of the object to be measured. Interconnecting the adjacent cross points will obtain the "correction curve". This illustrates that the scale positions to be detected by the light receiving device is distorted from the actual positions of the object to be measured.

Figure 17B:
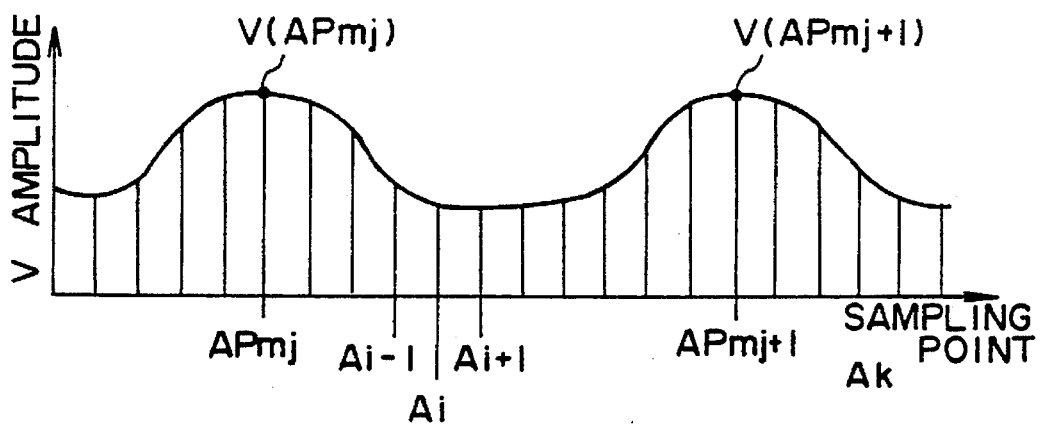
FIG. 17(B) illustrates a way of sampling the output from the light receiving device during measurement of the movement of the object using the distortion correction apparatus of the encoder.

FIG. 17(B) illustrates the sampling of the output from the light receiving device while measuring the rotation of the object to be measured using the distortion correction apparatus for the encoder as corrected per the above procedure.

As apparent from the drawing, the sampling points Ai−1, Ai, Ai+1, . . . are the same as those in FIG. 17(A), but their interval may be different from FIG. 17(A). The points where the reflected light beam received by the light receiving device becomes the maximum and their intensity are expressed by Apmj, Apmj+1, . . . and V(Apmj), V(Apmj+1), . . . , respectively. They are different from those in FIG. 17(A) reflecting the operation of the object to be measured. Accurate positions of the object to be measured can be obtained from the scale including mounting errors by making correction in accordance with the graph in FIG. 18. As mentioned above, the scale is driven accurately at a slower rate to obtain the graph in FIG. 18 accurately representing the distortion of the scale.

If the scale is attached to the object to be measured with sufficient rigidity, the physical relationship between the scale and the object to be measured is maintained even at high speed rotation. Accordingly, accurate position of the object to be measured at the specified time can be obtained from the horizontal axis ($\theta$) in the calibration curve in FIG. 18 corresponding to the vertical axis P at the scale detection point Apmj, Apmj+1, . . . in FIG. 17(B).

Figure 19:
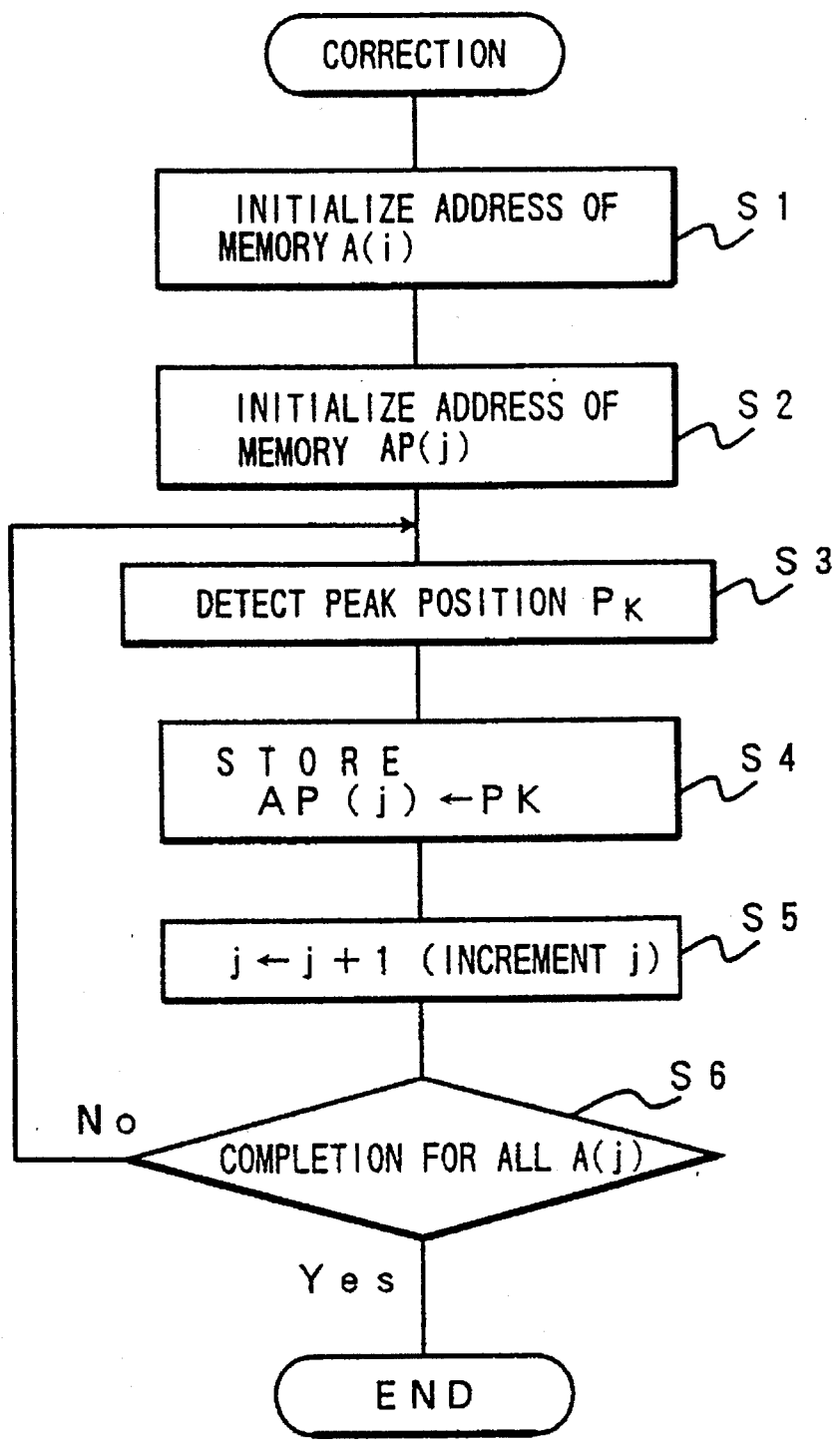
FIG. 19 is a flowchart to show the correction steps.

Now, the operation of the distortion correction apparatus for the encoder according to the present invention will be described by reference to the flowchart in FIG. 19. It is assumed here that the waveform data to be used for processing is stored in a waveform memory.

Firstly, the memory is initialized (steps S1 and S2). That is, initialized are the address i to read out the data A(i) from the waveform memory and the address j for sequentially storing the scale positions or the addresses to store peak values Apcj, Apcj+1, . . . in FIG. 17(A). The subsequent subroutine "Detection of Peak Positions Pk" (step S3) sequentially detects the addresses Apcj containing the peak values. After detecting Pk, such values are sequentially stored in a peak position memory AP(j) (step S4). After the storage, the storage address j is incremented (Step S5). Next step S6 is to judge if the address is the final. The above steps are repeated until the new waveform data is completely stored in all addresses before completing the calibration procedure (Step S6).

Figure 20:
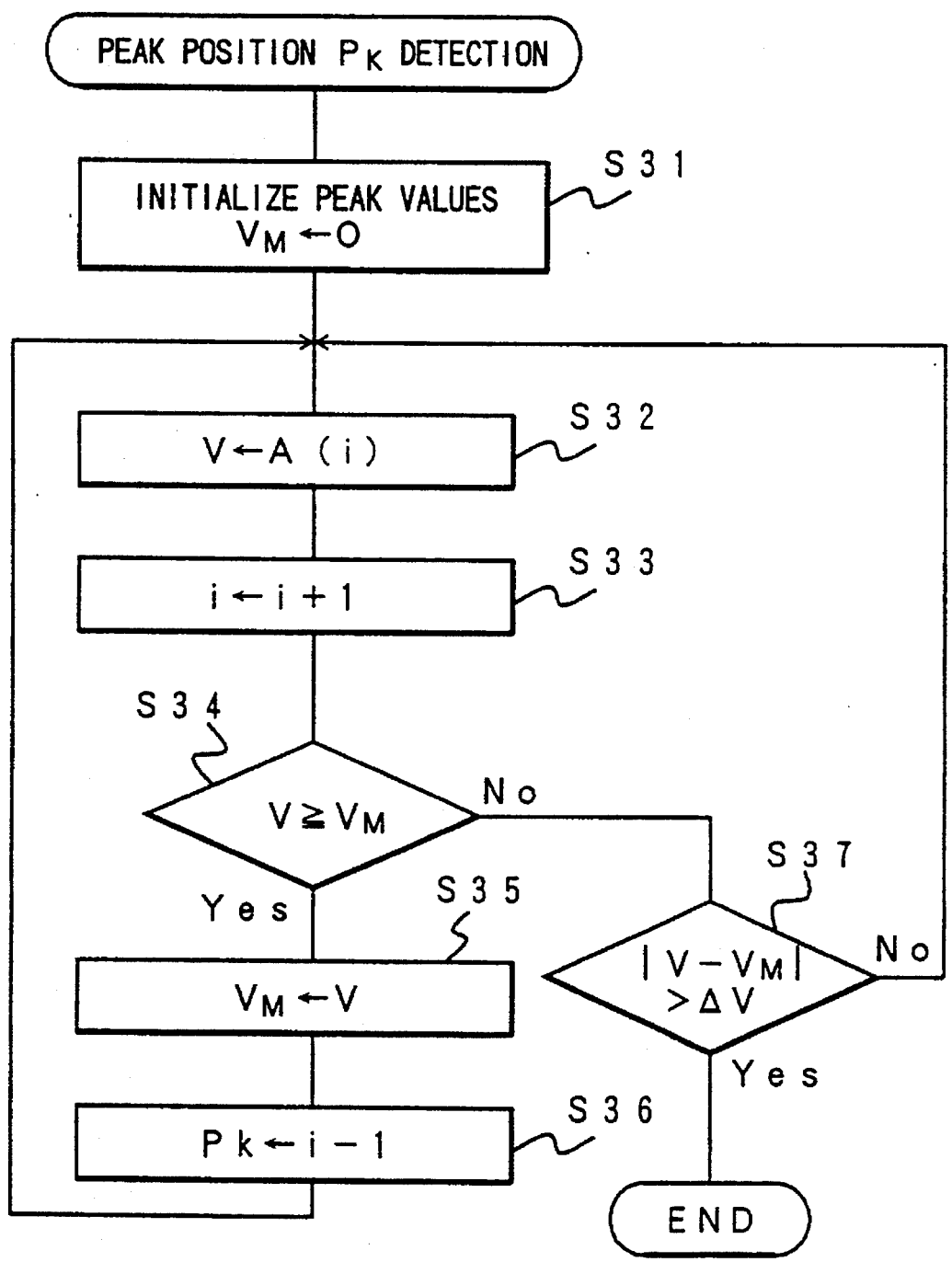
FIG. 20 is a flowchart to detect the peak point Pk.

Then, reference is made to the flowchart in FIG. 20 showing "Peak Position Pk Detection" subroutine.

Firstly, the memory VM to detect peak values is initialized (step S31). Then, the sampled values A(i) are sequentially read out of the waveform memory as V (step S32). The address i is incremented at every read-out (step S33). A comparison V>=VM is made to search for the maximum value (peak value) of V (step S34). If VM is not the maximum at that time, VM is updated (step S35). Simultaneously, the address i where VM is stored is obtained as Pk (step S36). If VM is not updated, it is possible that the peak point has passed. However, in order to avoid any error in detecting fluctuation due to noise as VM, a backlash of $\Delta V$ is provided (step S37). If the fluctuation is within the backlash, it returns to read out the waveform sample subsequent to step S32. If the fluctuation exceeds the backlash, it is deemed to have detected the peak value and completes the processing peak detection. On completing the correction procedure in the above steps, it is ready for "Measurement".

Figure 21:
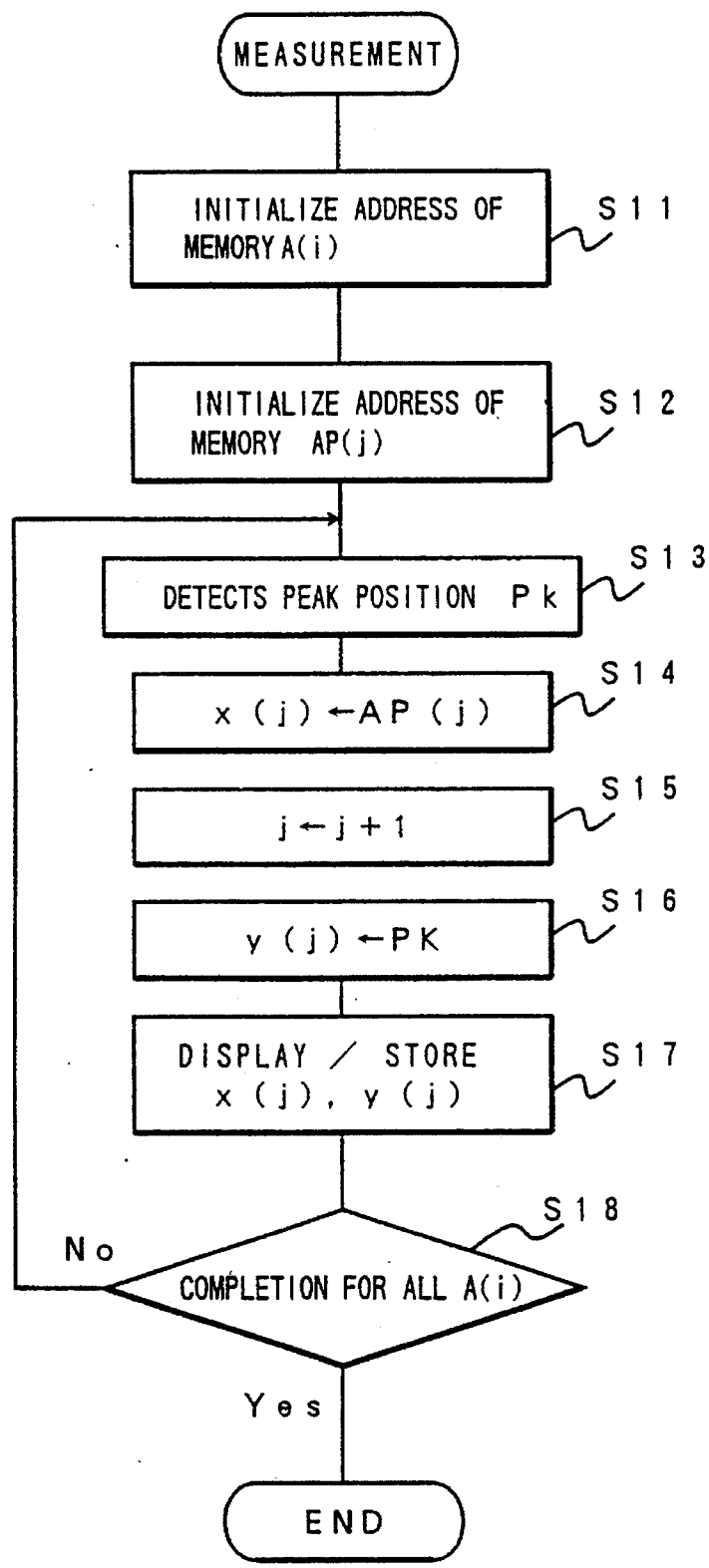
FIG. 21 is a flowchart to show the measurement steps.

FIG. 21 is a flowchart for the "Measurement" steps. It is assumed that the waveform data for processing is stored in the waveform memory.

Firstly, initialized are the read-out address i for the waveform memory A(i) and the read-out address j for the peak position memory AP(j) stored in the correction procedure (steps S11 and S12). The peak value Pk is detected (step S13). It is to be noted that Pk obtained here is the peak value in the scale of actual measurement. As apparent from the above description, the actual peak position of the object to be measured can be obtained by converting it using the graph in FIG. 18. That is, the content of the correction memory A(j) or the position of the scale is read as the actual position X(j) (horizontal coordinate) of the object to be measured (step S14). Then, the address j is incremented (step S15) and the actual position Pk of the object to be measured is set to y(j) (vertical coordinate) (step S16). The coordinates x(j), y(j) are used for the store/display or any other purpose (step S17). A judgment is made if the above processing has been completed in all addresses A(j) to perform such processing on all addresses of the waveform memory before completing the measurement.

Figure 22:
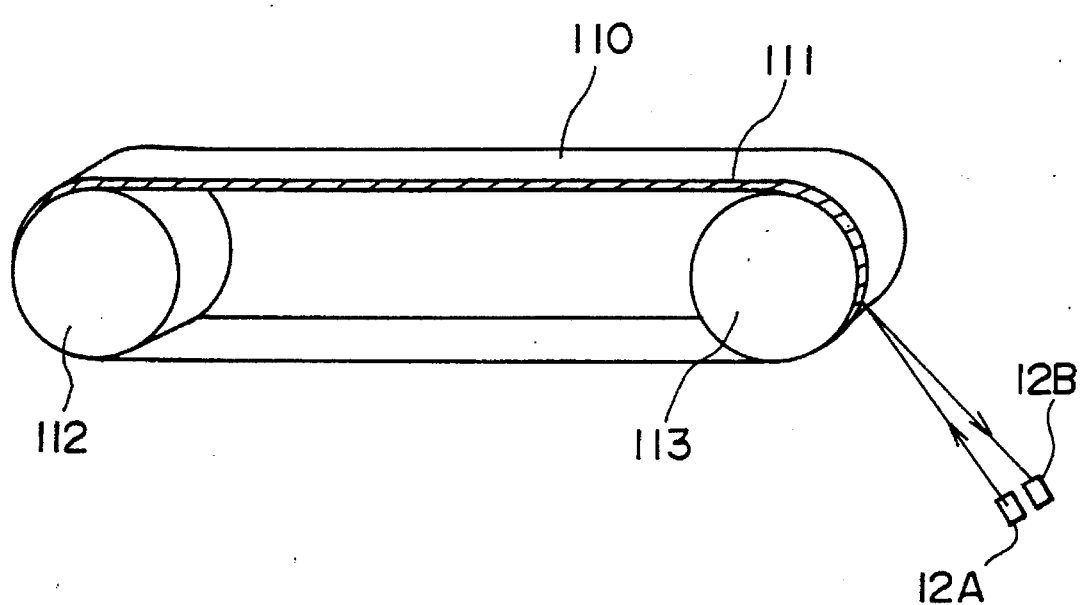
FIG. 22 is a drawing to show another embodiment of the tape-like encoder according to the present invention.
Figure 23:
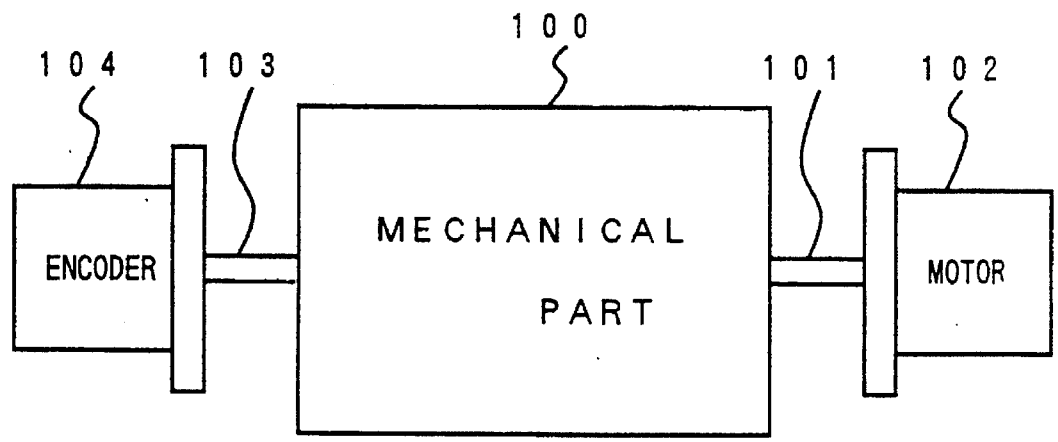
FIG. 23 is an example for measuring the rotary mode of a conventional motor shaft.
Figure 24:
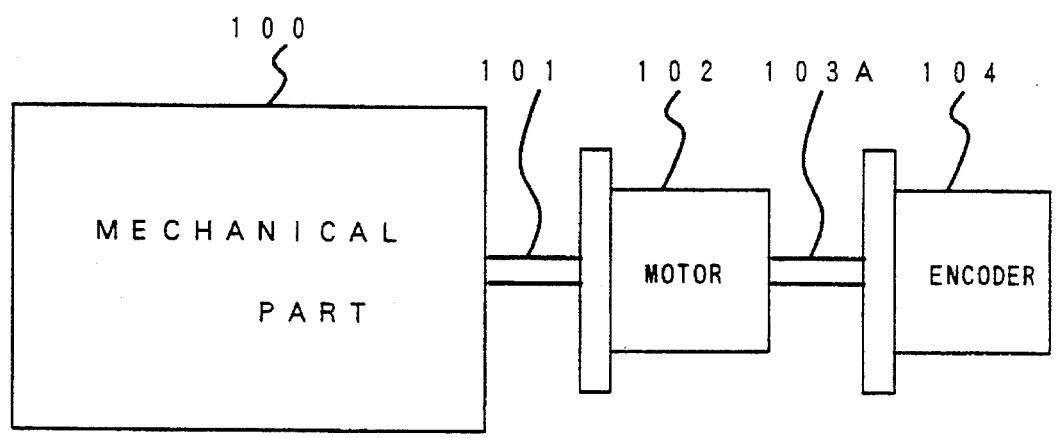
FIG. 24 is another example of measuring the rotary mode of a conventional motor shaft.
Figure 25:
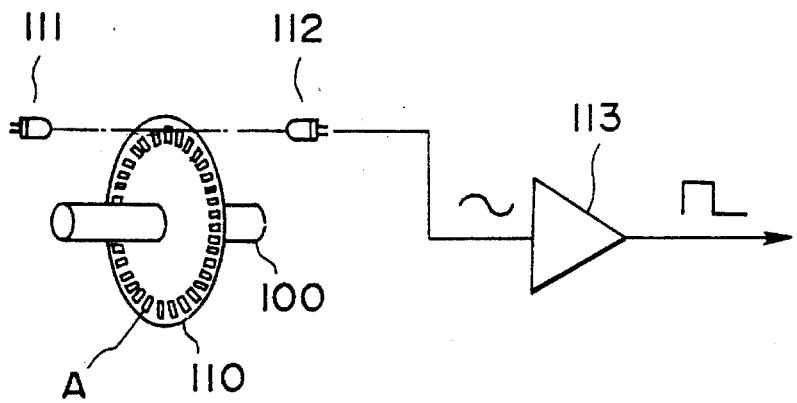
FIG. 25 shows the construction of a typical encoder.
Figure 26:
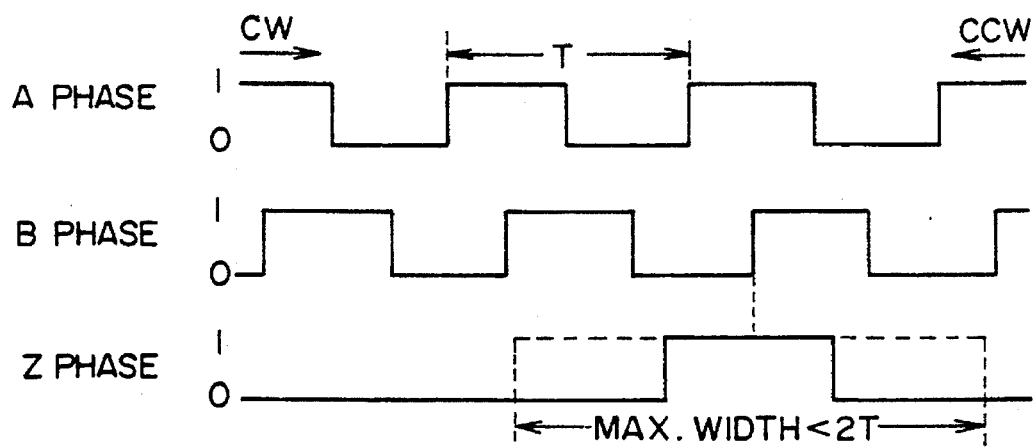
FIG. 26 is a timing chart to explain the operation of the encoder in FIG. 25.

Illustrated in FIG. 22 is another embodiment of the tape-like encoder according to the present invention. An object to be measured 110 is formed like a belt as illustrated in FIG. 22 and driven in a linear manner by pulleys 112, 113. An encoder 111 is incorporated with the belt 110. A laser beam from a light emitting device is directed onto the encoder 111 and the reflected light is received by a light receiving device. It features ease of installation of the scale.

In summary, it is understood from the above description that the encoder according to the present invention provides simple means to measure or judge the mode of rotation or movement of a motor shaft or other moving object. That is, a scale having regular arrangements of different optical or magnetic response properties such as, for example, reflection and diffusion portions or reflection and absorption portions can be attached to such object either directly or by way of any intermediate member. Such scale is detected either optically or magnetically. The scale can be attached after assembling of the object to be measured such as a motor shaft.

On the other hand, the label media and the optical identification system according to the present invention allow placement of the light emitting device and the light receiving device close to each other by forming the reflection portion in such a manner that the incident (incoming) and reflected (outgoing) lights to and from the reflection portion are parallel to each other. This enables realization of a compact and less expensive decoding apparatus and system. Also, the use of such label media enables to identification of various product information as well as mode of operation of any revolving or linearly moving objects.

What is claimed is:

1. An encoder comprising:

a scale to be attached to a rotating object to be measured by way of a mounting member, said scale having a regular arrangement of portions with different optical or magnetic response;

detection means to detect the difference in response of said scale;

measurement means to measure position information of rotating movement of said object to be measured based on the change in time in the response detected by said detection means;

memory means for storing the position information of said scale when said object to be measured is rotated by a known amount; and calibration means for calibrating the measured position information based upon the stored position information of said scale in said memory means, wherein said mounting member comprises a first mounting portion adapted to partially surround the rotating object and a second mounting portion adapted to partially surround the rotating object, said first mounting portion having a coupler portion and said second mounting portion having a corresponding mating portion for receiving said coupler portion, thereby securely engaging the first and second mounting portions to one another in surrounding engagement with the rotating object.

2. An encoder of claim 1 wherein said scale includes alternate arrangement of optically reflecting and diffusing portions.

3. An encoder of claim 1 wherein said scale includes alternate arrangement of optically reflecting and absorbing portions.

4. An encoder of claim 1 wherein said scale includes alternate arrangement of optically reflecting portions and corner cube portions.

5. An encoder of claim 1 wherein said scale is formed on the surface of a flexible tape.

6. An encoder of claim 1 wherein the measurements of the position information are calibrated in accordance with stored positions of said scale when said object to be measured is rotated by a known amount.

7. An encoder of claim 1 wherein said object to be measured is a shaft of a rotating object.

8. An encoder of claim 7 wherein said first mounting portion and said second mounting portion are coupled by a hinge for enabling easy installation on the shaft of said rotating object.

9. An encoder of claim 7 wherein said first mounting portion and said second mounting portion are secured to one another by an adhesive.

10. An encoder of claim 7 wherein said scale is attached to the circumferential surface of said mounting member mounted around the shaft of said rotating object.

11. An encoder of claim 10 wherein said mounting member is constructed to have smaller mass in the radial direction.

12. An encoder of claim 10 wherein a notch is formed in the abutting surface between said mounting member and the shaft.

13. An optical identification system characterized in that a label media for indicating a specified information comprising first and second portions arranged in a predetermined relationship, which defines said specified information, with each other is attached to an object, said first portion being configured to have parallel incoming and outgoing light beams and said second portion having an optical response characteristic different from that of said first portion; and a light beam from a light emitting device is directed to said first and second portions of said label media and the light reflected therefrom is detected by a light receiving device disposed parallel to said light emitting device; thereby identifying the information defined by the predetermined relationship of said label media in accordance with a change in the light receiving level by said light receiving device, wherein said object includes a rotating member and said label media is adapted for mounting to the rotating member via a mounting member, said mounting member comprising a first mounting portion adapted to partially surround a portion of the rotating member and a second mounting portion adapted to partially surround a portion of the rotating member, said first mounting portion having a coupler portion and said second mounting portion having a corresponding mating portion for receiving said coupler portion, thereby securely engaging the first and second mounting portions to one another in surrounding engagement with the rotating member.

14. An optical identification system of claim 13 wherein said first mounting portion and said second mounting portion are coupled by a hinge for enabling easy installation on a shaft of said rotating member.

15. An optical identification system of claim 13 wherein said first mounting portion and said second mounting portion are secured to one another by an adhesive.

* * * * *